(12) United States Patent
Gustafson et al.

(10) Patent No.: US 9,388,943 B2
(45) Date of Patent: Jul. 12, 2016

(54) ULLAGE TANK FOR VERTICAL STORAGE TANK

(71) Applicants: Keith Gustafson, Waleska, GA (US); Chris Schmoeckel, Cumming, GA (US); Lyle Holsinger, Canton, GA (US); Carl Taylor, Ball Ground, GA (US)

(72) Inventors: Keith Gustafson, Waleska, GA (US); Chris Schmoeckel, Cumming, GA (US); Lyle Holsinger, Canton, GA (US); Carl Taylor, Ball Ground, GA (US)

(73) Assignee: Chart Inc., Ball Ground, GA (US)

( * ) Notice: Subject to any disclaimer, the term of this patent is extended or adjusted under 35 U.S.C. 154(b) by 740 days.

(21) Appl. No.: 13/693,005

(22) Filed: Dec. 3, 2012

(65) Prior Publication Data
US 2013/0139925 A1 Jun. 6, 2013

Related U.S. Application Data

(60) Provisional application No. 61/566,415, filed on Dec. 2, 2011.

(51) Int. Cl.
*F17C 5/02* (2006.01)
*F17C 3/00* (2006.01)

(52) U.S. Cl.
CPC ... *F17C 5/02* (2013.01); *F17C 3/00* (2013.01); *F17C 2201/0109* (2013.01); *F17C 2201/0119* (2013.01); *F17C 2201/032* (2013.01); *F17C 2201/056* (2013.01); *F17C 2201/058* (2013.01); *F17C 2203/0629* (2013.01); *F17C 2205/0149* (2013.01); *F17C 2221/011* (2013.01); *F17C 2221/012* (2013.01); *F17C 2221/014* (2013.01); *F17C 2221/016* (2013.01); *F17C 2221/017* (2013.01); *F17C 2221/033* (2013.01); *F17C2223/0161* (2013.01); *F17C 2223/033* (2013.01); *F17C 2223/047* (2013.01); *F17C 2225/0123* (2013.01); *F17C 2225/045* (2013.01); *F17C 2227/0107* (2013.01); *F17C 2250/0408* (2013.01); *F17C 2250/075* (2013.01); *F17C 2260/018* (2013.01)

(58) Field of Classification Search
CPC ............. F17C 5/02; F17C 2203/018; F17C 2205/0149
USPC ......... 141/290, 312, 325–327, 369–370, 383; 62/45.1; 220/560.1, 560.4, 901
See application file for complete search history.

(56) References Cited

U.S. PATENT DOCUMENTS 3,425,234 A * 2/1969 Trepaud ................ F17C 13/126
 62/45.1
4,976,112 A 12/1990 Roberts et al.
(Continued)

FOREIGN PATENT DOCUMENTS

EP 2365241 A1 9/2011
EP 2039981 B1 12/2011

OTHER PUBLICATIONS

PCT/US2012/067650 International Search Report and The Written Opinion of the International Searching Authority. Feb. 28, 2013.

*Primary Examiner* — Mark A Laurenzi
*Assistant Examiner* — Timothy P Kelly
(74) *Attorney, Agent, or Firm* — Fred C. Hernandez; Mintz Levin Cohn Ferris Glovsky and Popeo, P.C.

(57) ABSTRACT

An ullage tank in a vertical cryogenic storage vessel that can store a liquefied gas is described. The ullage tank includes a hollow member. The ullage tank has at least one opening that allows communication between the ullage tank and an inner vessel of the vertical cryogenic vessel. The hollow member has a first open end and a second open end. The hollow member forms a vertically disposed passage through the ullage tank. The first open end and the second open end are in communication with the inner vessel. Related methods, apparatuses, systems, techniques and articles are also described.

7 Claims, 6 Drawing Sheets

(56) References Cited

U.S. PATENT DOCUMENTS

| | | | |
|---|---|---|---|
| 5,002,709 A * | 3/1991 | Chevalier | B29C 44/1247 264/46.5 |
| 5,404,918 A | 4/1995 | Gustafson | |
| 6,128,908 A | 10/2000 | Gustafson | |
| 6,698,473 B2 * | 3/2004 | Decarne | B67C 3/26 141/286 |
| 2005/0028536 A1 | 2/2005 | Noble et al. | |

* cited by examiner

ULLAGE TANK FOR VERTICAL STORAGE TANK

CROSS REFERENCE TO RELATED APPLICATION

This application claims priority under 35 U.S.C. §119(e) of the following provisional application, all of which is incorporated herein by reference in its entirety: U.S. Ser. No. 61/566,415, entitled "Ullage Tank," filed Dec. 2, 2011.

TECHNICAL FIELD

The subject matter described herein relates to an ullage tank in a vertical storage tank that can store cryogenic liquids.

BACKGROUND

Storage tanks are known to store liquids. The stored liquid may occupy the entire space in the storage tank. When the stored liquids are heated, those liquids can expand. As the stored liquid is already full, there may not be any space for the expanded liquid to occupy. Thus, in the absence of space for expansion, pressure can develop in the storage tanks, and shortened hold times or undesirable events can occur.

SUMMARY

The liquid container of certain cryogenic storage tanks may be divided into a main storage tank and a smaller secondary or ullage tank. Liquid cryogen is delivered to the main tank by a fill line. The main and ullage tanks are connected by a relatively small passage. When the main tank becomes full, the liquid flow is reduced dramatically, enabling detection by a monitoring device and thereby stopping the flow. Thereafter the ullage tank can fill with liquid until the pressure equalizes the two tanks. While one can construct such storage tanks in horizontal configurations, division of vertical storage tanks into two compartments to achieve the same advantage can present unique problems, which are addressed by the implementations described herein. Attachment of the ullage tank can require inventive geometry to allow communicating passages of several types while maintaining necessary structural provisions.

The current subject matter relates to an ullage tank in a vertical storage tank that can store a liquefied gas, such as a cryogenic liquid. The vertical storage tank includes an inner vessel suspended by its top, and an ullage tank suspended within the inner vessel. Thus, the ullage tank can be suspended from a top location of the vertical storage tank. The ullage can be constructed as a hollow body, with a central vertical passage stay member aligned with the inner vessel support member and the ullage tank support member.

The inner vessel support member, the ullage support member and the ullage tank stay member can be constructed coaxially, allowing passage of withdrawal piping through all three devices. The ullage tank support member has communicating openings to the inner vessel, allowing flow from or to the topmost part of the inner vessel from the inner space of the ullage tank support member.

In one aspect, an apparatus is described that includes an ullage tank and a hollow member. The ullage tank has at least one opening that allows communication between the ullage tank and an inner vessel of a vertical cryogenic vessel. The hollow member has a first open end and a second open end. The hollow member forms a vertically disposed passage through the ullage tank. The first open end and the second open end are in communication with the inner vessel.

In some variations, one or more of the following can be implemented in any feasible combination. The hollow member forms a continuous passage with the ullage tank support member. The hollow member forms a continuous passage with an inner vessel support that is configured to provide support to the inner vessel. One or more pipes are inserted through the hollow member. The one or more pipes include a fill line, a withdrawal line. The hollow member is a stay device. The hollow member is a tube. The ullage tank is positioned in an upper portion of the inner vessel.

In another aspect, an ullage tank support apparatus is described. The ullage tank support apparatus includes a support member and multiple openings. The support member is configured to suspend an ullage tank within a vertical cryogenic vessel. The support member is coupled to a top head of the vertical cryogenic vessel. The multiple openings exist in the support member. The openings allow a communication between an upper part of an inner vessel of the vertical cryogenic vessel and the support member forming a passage through the ullage tank. The openings allow a substantially equal pressure between the inner vessel and an interior of the support member.

In some variations of the above-mentioned aspect, one or more of the following can be implemented in any feasible combination. The support member is coupled to the top head via a reinforcing nozzle. The support member is a tube. The support member is an extension of a hollow member through the ullage tank.

In yet another aspect, a liquefied gas is received in an internal chamber enclosed by an inner vessel of a vertical storage tank. The liquefied gas is to be stored in the internal chamber. The receiving of the liquefied gas is stopped when the vertical storage tank is filled with liquefied gas and when a flow rate of the liquefied gas into the storage tank drops below a first threshold. An entering of the filled liquefied gas in an ullage tank is delayed. The ullage tank includes a hollow member. After the vertical storage tank is filled with the liquefied gas, liquid contents of the inner vessel are allowed to gradually flow into the ullage tank so as to balance pressures of the inner vessel and the ullage tank.

In variations of the above-noted aspect, one or more of the following can be implemented in any feasible combination. The liquefied gas is a cryogenic liquid. The receiving of the liquefied gas in the internal chamber is performed via a fill line passing through the ullage tank support apparatus. From the internal chamber and via a withdrawal line passing through the hollow member in the ullage tank, a portion of the stored liquefied gas is provided based on a demand for liquefied gas to a use device. From a head portion of the inner vessel via the opening in the ullage tank support apparatus and a vent line, excess gas pressure can be removed when the pressure in the internal chamber exceeds a second threshold. The drop in the flow rate of the liquefied gas into the inner vessel is detected by measuring an increase in vessel pressure.

The subject matter described herein provides many advantages. For example, vertical tanks can occupy less floor space than floor space occupied by horizontal tanks of a same or similar volume. Thus, it can be advantageous if ullage tanks are implemented within vertical storage tanks. The one or more openings in the ullage tank support member can allow advantageous dispersion increasing the fill rate of the liquefied gas. Further, an ullage tank support member can advantageously provide mechanical support to the ullage tank while also providing a path for fluid or for piping.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

Like reference symbols in the various drawings indicate like elements.

DETAILED DESCRIPTION

Figure 1:
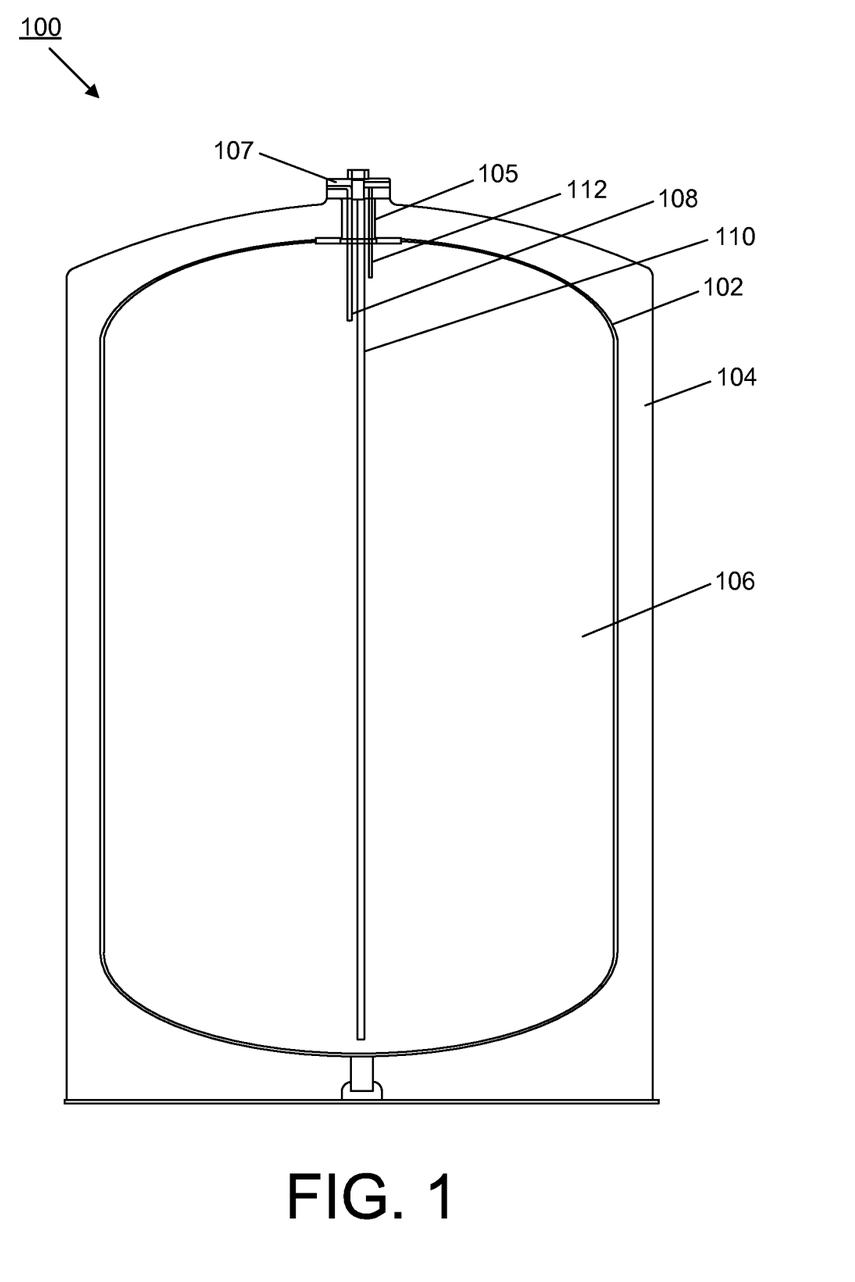
FIG. 1 illustrates an implementation of a vertical storage tank.

FIG. 1 illustrates an implementation of a vertical storage tank 100. The vertical storage tank 100 includes an inner vessel 102. The inner vessel 102 is enclosed by an outer vessel 104. The inner vessel 102 can enclose an interior chamber 106. The inner vessel 102 is joined to the outer vessel 104 by an inner vessel support member 105. The inner vessel support member 105 is connected, at its top end, to an outer component (for example, outer knuckle or outer joint) 107 or to an outer vessel. The inner chamber 106 receives the liquefied gas through a fill line 108, stores the liquefied gas, and provides fluid to a use device (for example, a laser cutter, a welder, a food refrigeration device, or any other device) through a withdrawal line 110. Excess vapor can be exhausted through a vent line 112. The fill line 108, the withdrawal line 110, and the vent line 112 pass through the inner vessel support member 105, which is open from both top and bottom. In one implementation, the stay and support members can be tubes. In some other implementations, the members can be other types of similar structures, such as passages, pipes, or the like. The cross-sections of these tubes and other structures can have various shapes, such as a circle, ellipsis, square, triangle, pentagon, hexagon, polygon, and other shapes.

The location of the entry of the piping (that is, the fill line 108, the withdrawal line 110, and the vent line 112) 100 can be advantageous, because vapor, which is at the top, can be removed more easily. For example, the vent line 112 facilitates a removal of excess gas pressure when the pressure in the internal chamber 106 exceeds a threshold. Further, the top location can allow vapor in the inner vessel support tube 105 to undergo thermal stratification, while a bottom location (which may not be implemented) can disadvantageously allow liquid to reside outside the inner vessel, or form a convection loop.

The liquefied gases can be cryogenic liquids. The cryogenic liquids can be at least one of nitrogen, helium, neon, argon, krypton, hydrogen, methane, liquefied natural gas, and oxygen, although other types of gases are within the scope of this disclosure.

Figure 2:
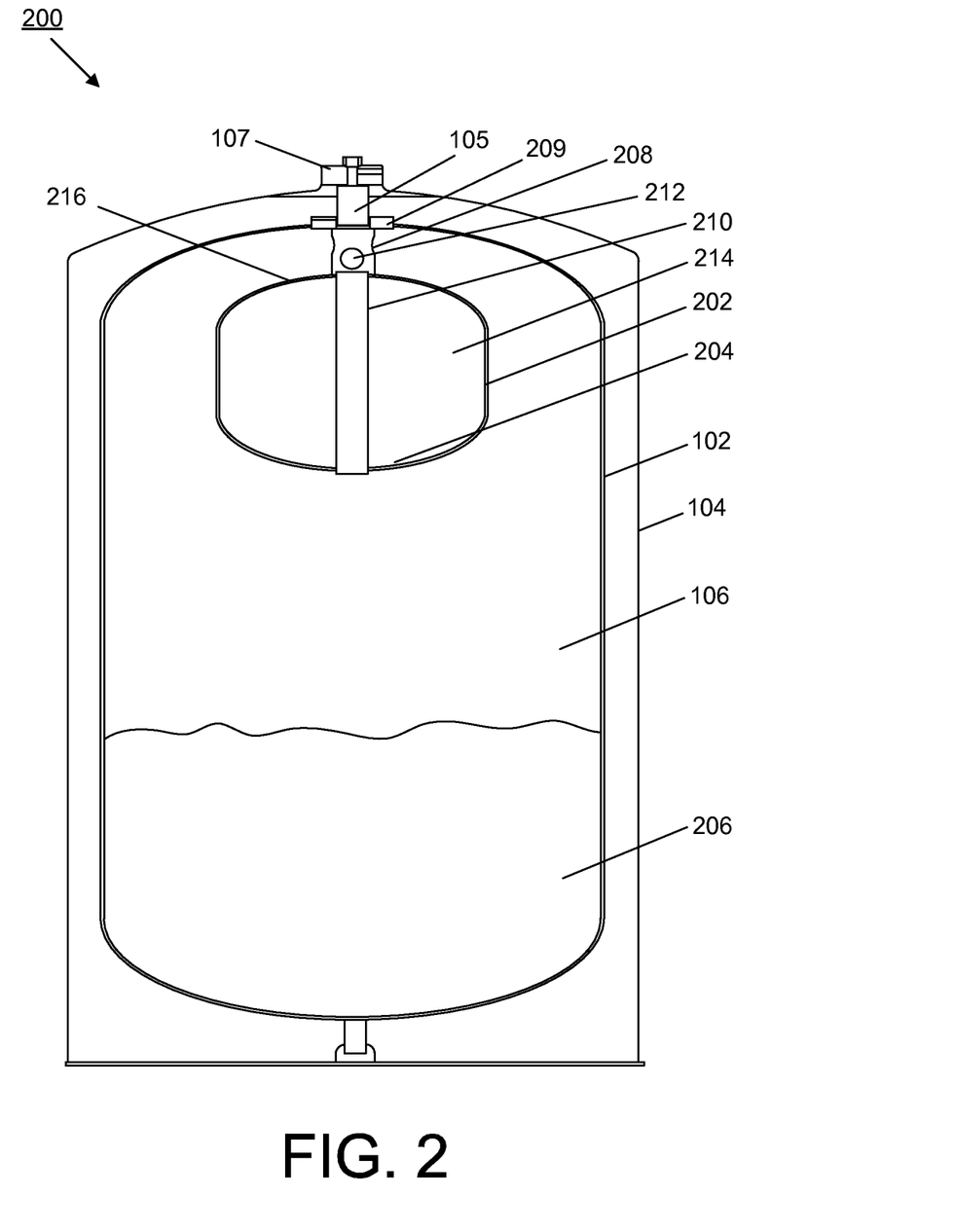
FIG. 2 illustrates a vertical storage tank with an ullage tank.
Figure 3:
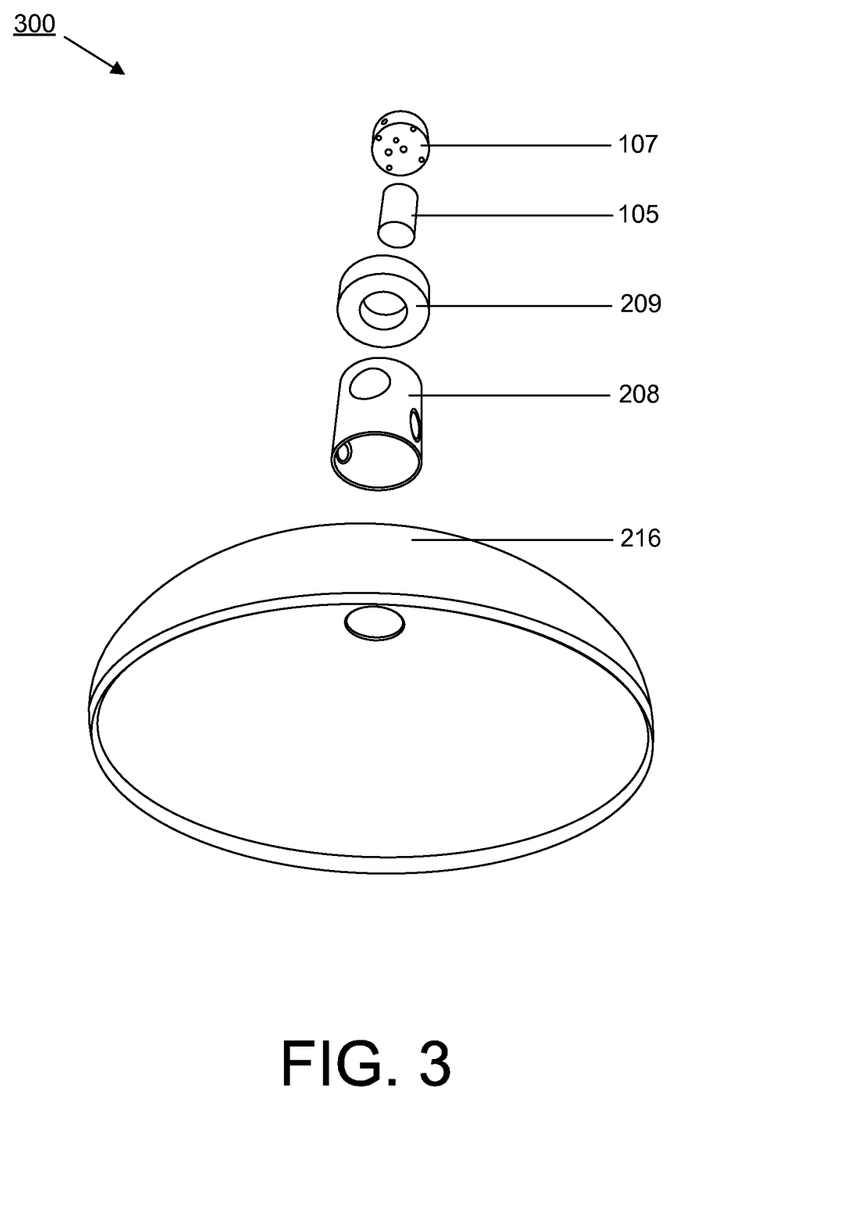
FIG. 3 illustrates a perspective view of a suspension apparatus assembly.
Figure 4:
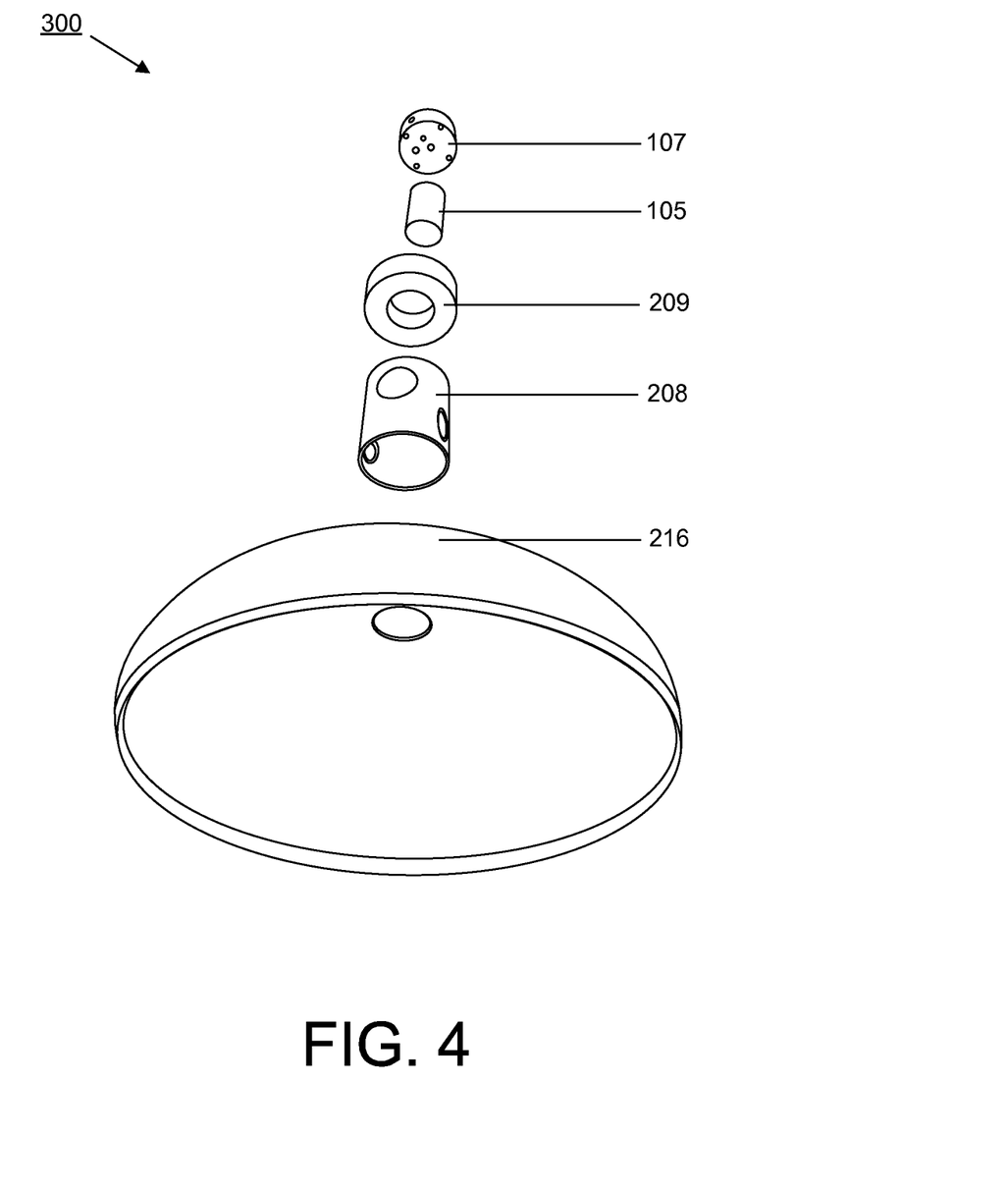
FIG. 4 illustrates another perspective view of the suspension apparatus assembly.
Figure 5:
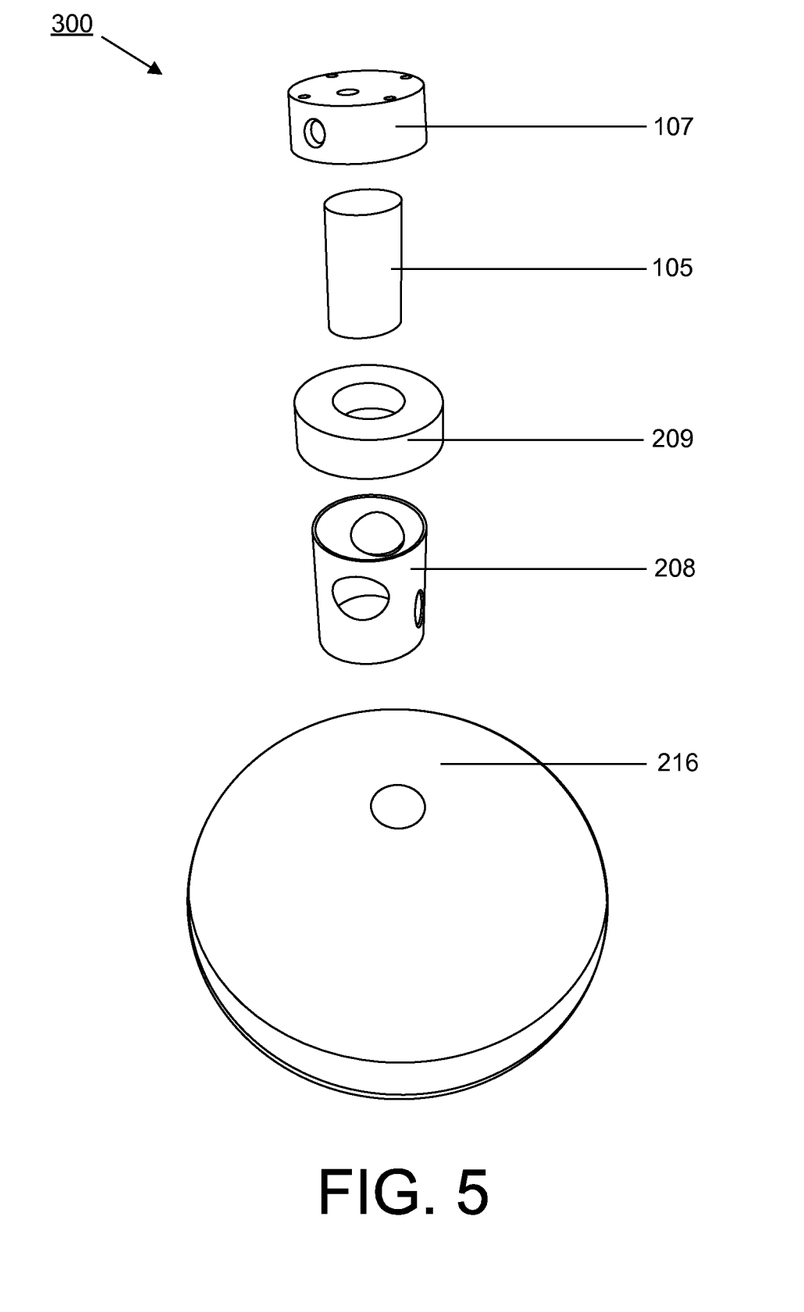
FIG. 5 illustrates another perspective view of the suspension apparatus assembly.
Figure 6:
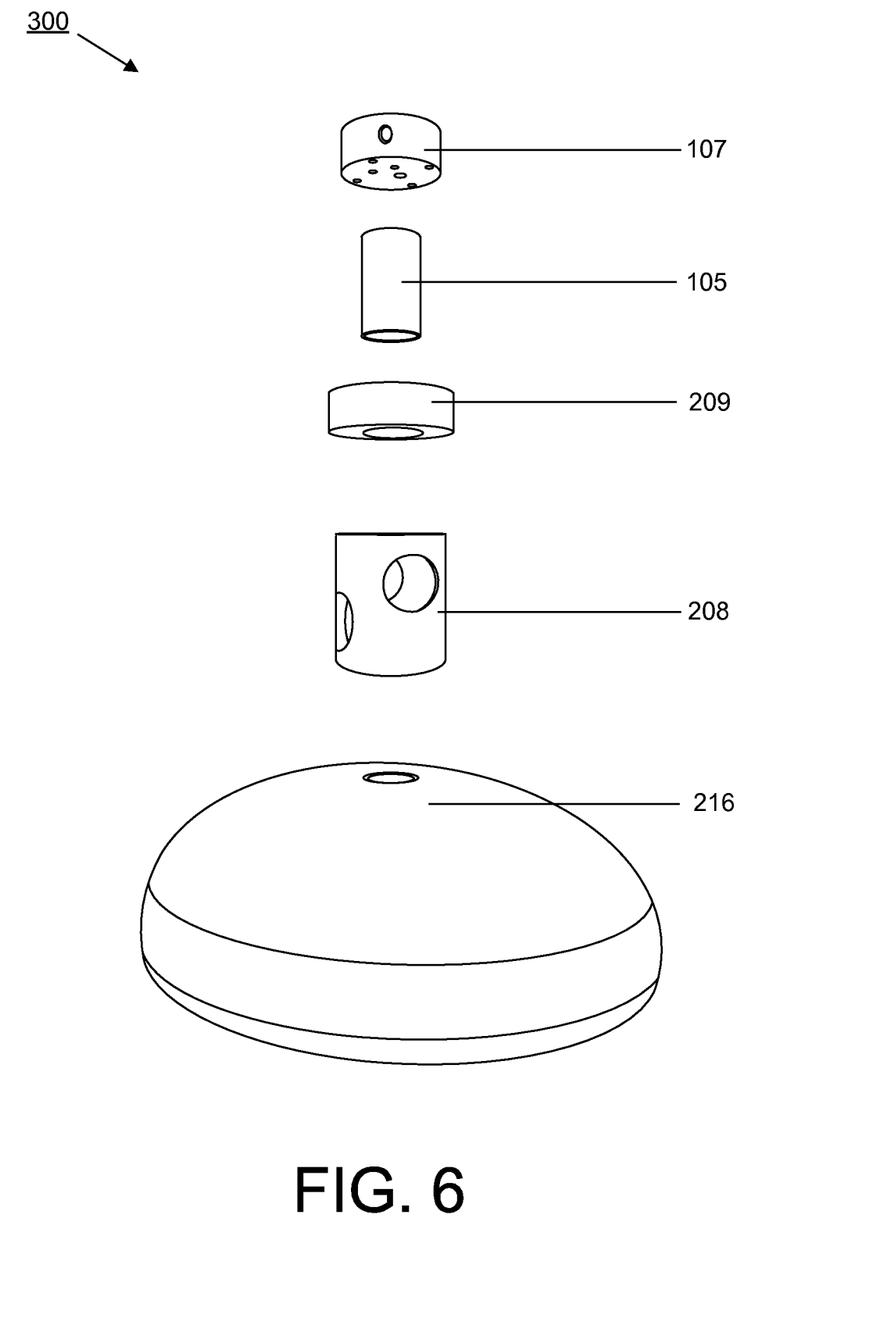
FIG. 6 illustrates another perspective view of the suspension apparatus assembly.

FIG. 2 illustrates a vertical storage tank 200 that can include an ullage tank 202 suspended from a location adjacent but below the suspension member suspending the inner vessel 102. Vertical storage tank 202 can be a vertical cryogenic vessel. The fill line 108, the withdrawal line 110, and the vent line 112 can be suspended as shown in FIG. 1. For simplicity, the fill line 108, the withdrawal line 110, and the vent line 112 are not illustrated in FIG. 2.

The ullage tank 202 occupies a volume within the interior chamber 106. The ullage tank 202 can be attached to the head of the inner vessel 102, or by one or more attachment apparatuses 212. The ullage tank 202 may not be attached to the side wall of the inner vessel 102. Such a top location for the ullage tank 202 allows certain mechanical, structural, economic, and/or thermal efficiencies, and can allow use of pressure strengthening techniques.

An external monitoring device can be implemented to determine whether the filling equipment should be stopped, as described below. Due to the orifice 204 in the ullage tank 202 opposing flow of liquefied gas into the ullage tank 202, the pressure in the inner vessel 102 can increase. Such opposing pressure increases the pressure of liquefied gas in the fill line 108. The external monitoring device can be implemented outside the vertical tank 200 to determine/measure this increase in pressure or reduction of flow in the portion of fill line 108 that can extend outside the vertical tank 200. If the reduction of flow of liquefied gas into the storage tank 100 drops below a threshold, the filling equipment can be stopped. This drop can be detected by measuring an increase in the vessel pressure, which can be the pressure of the liquefied gas in the inner vessel 102. When that pressure exceeds a threshold, the filling equipment can be stopped.

When the filling equipment is stopped such that no more liquefied gas enters the inner vessel 102 from the fill line 108, the liquefied gas can partially fill the ullage tank until pressure balance is achieved and liquid level in the two tanks is equal. Because the ullage tank 202 will be at a lower pressure than the inner vessel at fill termination, the ullage tank 202 can continue to fill, thereby creating a new ullage space at the top of the inner vessel 102.

The inner vessel support member 105 can be connected, at its bottom end, to the inner vessel 102 or to reinforcing nozzle 209, as described above. Further, the inner vessel 102 or reinforcing nozzle 209 can be connected to an ullage tank support member 208. The ullage tank support member 208 can serve as a junction of the inner vessel 102, an ullage tank 202, and a hollow member 210. Hollow member 210 can be a stay, a tube, or any similar device. Hollow member 210 forms a vertically disposed passage through ullage tank 202. The open bottom end of the ullage tank support member 208 can attach to the ullage tank 202 and to the open top end of the ullage tank hollow member 210. Both the bottom and top ends of the ullage tank hollow member 210 can be in communication with the inner vessel 102. The interiors of the inner vessel support member 105, ullage tank support member 208, and ullage tank hollow member 210 can be connected with each other so as to provide a continuous vertical passage. Although a vertical passage is described, the passage can also be convoluted (for example, zig zag), or can have any other direction. In one implementation, the stay and support members can be tubes. In some other implementations, the members can be other types of similar structures, such as passages, pipes, or the like. The cross-sections of these tubes and other structures can have various shapes, such as a circle, ellipsis, square, triangle, pentagon, hexagon, polygon, and other shapes.

The inner vessel support tube 105, the ullage tank support tube 208, and the ullage tank hollow member 210 can be constructed from any of a variety of materials including austenitic stainless steel. The use of austenitic stainless steel can be advantageous because austenitic stainless steels can have better material properties at cryogenic temperatures when compared to material properties of carbon steel. The inner vessel support tube 105, the ullage tank support tube 208, and the ullage tank hollow member 210 can be secured together in a variety of manners, such as by brazing or welding. Although brazing and welding are described, other fastening/attachment mechanisms can also be used, such as screwing, soldering, attaching with a glue, threading, mechanical fitting, pressure sealing, and other fastening/attachment mechanisms.

In some implementations, the inner vessel support tube 105, the ullage tank support tube 208, and the ullage tank hollow member 210 can be fabricated as a single part, or of a combination of parts that perform the functions of each of the inner vessel support tube 105, the ullage tank support tube 208, and the ullage tank hollow member 210.

The ullage tank support tube 208 can have one or more openings 212 that can allow filling, withdrawing, and venting fluid to pass from or to the interior chamber 106 via the inner vessel support tube 105 and the ullage tank support tube 208. Thus, the openings 212 facilitate the communication between the interior of the ullage tank support tube 208 and the interior chamber 106 at a high point in chamber 106.

The ullage tank 202 can be attached to the bottom of the ullage tank support tube 208 and the top and bottom ends of the ullage tank hollow member 210. This attaching can be performed by brazing or welding. Although brazing and welding are described, other fastening/attachment mechanisms can also be used, such as screwing, soldering, attaching with a glue, threading, mechanical fitting, pressure sealing, and other fastening/attachment mechanisms. The ullage tank 202 can include an ullage space 214. The ullage tank hollow member 210 can pass through the ullage space 214 so as to provide a plumbing path (that is, path for liquid or vapor tubes) through the ullage tank 202. Additionally, the ullage tank hollow member 210 can advantageously strengthen the ullage tank 202.

The ullage tank 202 can be constructed of any of a variety of materials including austenitic stainless steel. It can be advantageous to use austenitic stainless steel because austenitic stainless steel can have better material properties at cryogenic temperatures than those of carbon steel. While austenitic stainless steel is described, other materials can also be used, such as alloys of one or more of chromium, nickel, iron, titanium and other chemical elements.

The continuous vertical passage formed by the interiors of the inner vessel support tube 105, ullage tank support tube 208 and ullage tank hollow member 210 can provide a connecting/communicating path from the inner vessel support tube 105 to the internal chamber 106. This connecting/communicating path can enable filling, withdrawing, venting and gauging of the pressure vessel contents by separate devices, and can allow installation and removal of manufacturing fixtures. The connecting path can include one or more of: the fill line 108, the withdrawal line 110, vent line 112, and other possible lines.

As noted above, the ullage tank 202 can have an orifice 204. While the orifice 204 is shown on the bottom of the ullage tank 202, in other implementations, the orifice 204 can be located in other positions, such as the top or sidewall of the ullage tank 202 or in the ullage tank hollow member 210. In one implementation, the orifice 202 can be 7/64 inches (or around 7/64 inches) in diameter, and is the only opening in the ullage tank 202 that can allow access to the ullage space 214. In some other implementations, the orifice 202 can be smaller than 9/64 inches in diameter. In another implementation, the orifice 202 can be between approximately 1/64 inches and 1/2 inches in diameter.

The ullage tank 202 is located in the upper region of the internal chamber 106 to improve performance. More specifically, the ullage tank can drain its contents as the inner vessel 102 empties. This location can allow for the correct filling of vessels that may be still partially full by allowing the ullage tank 202 to completely drain by gravity after only approximately 15% of the vessel contents have been used. This can maximize the ullage space available in the inner vessel 102 irrespective of whether the tank 200 is filled from the top or from the bottom.

Thus, the available space in the upper region of the inner vessel 102 can advantageously be used for multiple functions, such as for locating the ullage tank 202, for providing support to the ullage tank 202, and for installing the piping that includes the fill line 108, the withdrawal line 110, and the vent line 112.

As noted above, the ullage tank 202 can be supported by the ullage tank support tube 208, which can be open from the top and the bottom. From this open ullage tank support tube 208, several communicating passages can pass, as noted below.

From a first communicating passage, vapor evolving from the stored liquid 206 can aggregate to the highest point in the tank 200 and can be safely vented without expelling the liquid 206.

Another communicating passage can contain at least a part of the fill line 108. During filling, the openings 212 can allow incoming liquefied gas into the vapor surrounding the ullage tank 202, and thereby can reduce the vapor pressure inside the inner vessel 102.

Another communicating passage can allow passage of a pressure instrument line or gauge line located within the ullage tank support tube 208. Because the size of the openings 212 can be large, the pressure within the pressure instrument line or gauge line can be the same or about the same as the pressure in vapor space of the inner vessel 102. Such pressures advantageously allow an accurate monitoring of pressure and liquid level during operations without necessity of routing a separate line to the pressure vessel chamber 106.

Advantageously, the ullage tank hollow member 210 can provide a path for efficient top filling with pressure reduction, as described above. Further, the ullage tank hollow member 210 can also mechanically stiffen the head 216 of the ullage tank 202 against external pressure. When the inner vessel 102 is first filled, a substantial pressure difference can occur between the inner vessel and the inside of the ullage tank 202, as the communicating orifice 204 can be quite small. The ullage tank hollow member 210 can provide structure to resist this pressure and can advantageously allow use of thinner materials for construction of the ullage tank 202.

After fill has stopped, the communicating orifice 204 allows the pressures between inner vessel 102 and ullage tank 202 to balance. As the pressures balance, sufficient gas space develops in the vessel to prolong hold times of the contents without relieving.

FIGS. 3-6 illustrate perspective views of an exemplary implementation of a suspension apparatus assembly 300. The suspension apparatus assembly 300 can include components including the outer joint 107, the inner vessel support tube 105, the reinforcement nozzle 209, the ullage tank support tube 208, and the ullage head 216. One or more of these components can be combined into a single part in some implementations. In further implementations, each of one or more components can be made of separate parts. The components of the suspension apparatus assembly 300 can be coupled in the shown order. Such coupling can be performed by one or more coupling mechanisms, such as brazing and welding. Although brazing and welding are described, other fastening/attachment mechanisms can also be used, such as screwing, soldering, attaching with a glue, threading, mechanical fitting, pressure sealing, and other fastening/attachment mechanisms.

Although a few variations have been described in detail above, other modifications are possible. For example, the logic flows described herein may not require the particular order shown, or sequential order, to achieve desirable results.

All claims in this application, including but not limited to the original claims, are hereby incorporated in their entirety into, and form a part of, the written description of the invention.

As used herein, the singular forms "a," "an," and "the" include plural reference unless the context clearly dictates otherwise.

Subheadings herein are included for the benefit of the reader. They should not be used to limit the invention.

The terms and expressions employed herein have been used as terms of description and not of limitation, and there is no intention in the use of such terms and expressions, or any portions thereof, to exclude any equivalents now know or later developed, whether or not such equivalents are set forth or shown or described herein or whether or not such equivalents are viewed as predictable, but it is recognized that various modifications are within the scope of the invention claimed, whether or not those claims issued with or without alteration or amendment for any reason. Thus, it shall be understood that, although the present invention has been specifically disclosed by embodiments and optional features, modifications and variations of the inventions embodied therein or herein disclosed can be resorted to by those skilled in the art, and such modifications and variations are considered to be within the scope of the inventions disclosed and claimed herein.

Specific methods and compositions described herein are representative of embodiments and are exemplary and not intended as limitations on the scope of the invention. Other objects, aspects, and embodiments will occur to those skilled in the art upon consideration of this specification, and are encompassed within the spirit of the invention as defined by the scope of the claims. Where examples are given, the description shall be construed to include but not to be limited to only those examples. It will be readily apparent to one skilled in the art that varying substitutions and modifications may be made to the invention disclosed herein without departing from the scope and spirit of the invention, and from the description of the inventions, including those illustratively set forth herein, it is manifest that various modifications and equivalents can be used to implement the concepts of the present invention without departing from its scope. A person of ordinary skill in the art will recognize that changes can be made in form and detail without departing from the spirit and the scope of the invention. The described embodiments are to be considered in all respects as illustrative and not restrictive. Thus, for example, additional embodiments are within the scope of the invention and within the following claims.

What is claimed is:

1. An apparatus comprising:
   a cryogenic liquid storage tank formed of an inner vessel and an outer vessel that contains the inner vessel;
   an inner vessel support member having an inner passage, a first end and a second end, the first end of the inner vessel support member being connected to an uppermost region of the outer vessel and the second end of the inner vessel support member being connected to an uppermost region of the inner vessel such that the inner vessel support provides a sole connection between the inner vessel and outer vessel;
   a reinforcement nozzle positioned at the uppermost region of the inner vessel and connecting the inner vessel support member to the inner vessel, the reinforcement nozzle being co-axial with the inner vessel support member;
   an ullage tank inside the inner vessel having at least one opening that allows communication between the ullage tank and the inner vessel of a vertical cryogenic vessel, wherein the ullage tank is positioned entirely within an upper half region of the inner vessel;
   a tubular ullage tank support member that connects the uppermost region of the inner vessel to an uppermost region of the ullage tank inside the inner vessel;
   a hollow member having a first open end and a second open end, the hollow member forming a vertically disposed passage through the ullage tank, the first open end and the second open end being in communication with the inner vessel; and
   a cryogenic liquid inside the inner vessel.

2. The apparatus of claim 1, wherein the hollow member forms a continuous passage with an internal passage of the ullage tank support member.

3. The apparatus of claim 2, wherein the hollow member forms a continuous passage with the inner passage of the inner vessel support member that is configured to provide support to the inner vessel.

4. The apparatus of claim 1, wherein one or more pipes are located through the hollow member.

5. The apparatus of claim 4, wherein the one or more pipes comprise a fill line and a withdrawal line.

6. The apparatus of claim 1, wherein the hollow member is a stay device.

7. The apparatus of claim 1, wherein the hollow member is a tube.

* * * * *